3,049,553
Patented Aug. 14, 1962

3,049,553
PROCESS FOR THE PRODUCTION OF THE REDUCTION PRODUCTS OF THE VITAMIN $D_2$, VITAMIN $D_3$, AND THE CORRESPONDING IRRADIATED PROVITAMINS
Friedrich Schenck, Wuppertal-Elberfeld, Germany, assignor to Farbenfabriken Bayer Aktiengesellschaft, Leverkusen, Germany, a corporation of Germany
No Drawing. Filed Feb. 9, 1960, Ser. No. 7,530
Claims priority, application Germany Feb. 11, 1959
10 Claims. (Cl. 260—397.2)

The present invention relates to improvements in processes for the manufacture of the reduction products of the vitamin D series such as vitamin $D_2$ and vitamin $D_3$ and has for an object the provision of an improved process for the manufacture of reduction products of the vitamin D series which are characterized by a particularly bright color, a high specific rotation potency as well as the characteristic absorption maxima of dihydrotachysterol.

Heretofore, according to customary practices, the reduction of vitamin $D_2$ and vitamin $D_3$ or the corresponding irradiated provitamin was accomplished by reacting vitamin $D_2$ in a solution of a neutral hydrogen donor such as butanol and sodium to produce a reaction product containing dihydrotachysterol as its active principle. This reaction product is characterized by the specific rotation, $(\alpha)_D$, of $+22°$ to $25°$ in alcohol. Refinements in this type of process, including the use of polyols such as glycol or glycerol as the neutral hydrogen donor, provide somewhat better products (i.e., $[\alpha]_D = +42-46°$ in ether).

It has now been discovered if the reduction of vitamin $D_2$ or vitamin $D_3$ is carried out by reacting the same in the presence of sodium and an acidic or basic hydrogen donor preferably selected from the group consisting of organic acids, bases and their salts, there is produced a reaction product which is particularly bright and pure as indicated by its high specific rotation. It is presently believed that the use of a hydrogen donor, of the type above-described and hereinafter to be more particularly defined, during the reduction reaction provides a reaction product substantially free of polymerization products as indicated by the brightness of the recovered reduction products and their high specific rotation.

The hydrogen donors which have been found so particularly effective in the process of this invention include aliphatic monocarboxylic acids such as acetic acid, propionic acid and the like; esters including esters of aliphatic dicarboxylic acids and esters of boric acid and anhydrous glycerol such as diethyl malonate and boroglycerin glycerite; organic amines including cycloaliphatic and aliphatic monoamines, aliphatic diamines and alkanolamines such as cyclohexylamines, diisobutylamine, ethylenediamine and ethanolamine respectively; and aromatic mononuclear hydroxyl-containing hydrocarbons such as phenol.

The hydrogen donors described above can be employed in the process of the invention singly or in combination with each other or with customary solvents or thinning agents such as hydrocarbons and ethers; xylene being particularly preferred.

The temperature at which the process of the invention is carried out is not necessarily critical and can be varied over a wide range of from about 100° C. to 300° C. and higher if necessary. Preferably, however, the temperature of the reduction reaction is maintained in the range of from about 110° C. to about 150° C.

In carrying out the process of the invention sodium is heated in the acidic or basic hydrogen donor or, if desired, in a solvent, such as xylene, with stirring to boiling whereupon vitamin $D_2$ or vitamin $D_3$ or the corresponding irradiated provitamin, dissolved in the hydrogen donor, solvent or a mixture thereof, is generally slowly added over a period of time varying from one to several hours. Heating is continued and the reaction proceeds until substantially all of the sodium is consumed. After the reaction is complete the residual sodium is consumed by the addition of methanol and/or water. If the reaction solution is too thick additional solvent or thinning agent can be added to thin out the solution. The reaction product can then be recovered by driving off the solvent and taking the product up in ether. The resin in ether solution can then be washed with a dilute solution of caustic soda and with water, if desired, purified with animal charcoal and vacuum dried.

The following specific examples will serve to illustrate the practice of the invention in accordance with the foregoing principles and procedures:

*Example 1*

A solution containing 10 grams of sodium and 80 cubic centimeters of cyclohexylamine is heated, with stirring, to boiling whereupon a solution of 5 grams of vitamin $D_2$ in a mixture 25 cubic centimeters cyclohexylamine and 5 cubic centimeters of n-butyl alcohol is added over a period of about five minutes followed by the dropwise addition of 30 cubic centimeters of n-butyl alcohol over a period of forty-five minutes. The reaction is continued for two hours followed by the gradual addition of a solution of 80 cubic centimeters of cyclohexylamine and 35 cubic centimeters of n-butyl alcohol. The reaction conditions are maintained for an additional two hours whereupon any remaining sodium is taken up with water. The reaction mixture is further diluted with water and the amine and alcohol removed by vacuum distillation. The resin remaining in the water is dissolved in ether, washed with water, dilute sulfuric acid, twice more with water, dried, treated with animal charcol, filtered, evaporated and vacuum dried at a steeping temperature of 80° C. to 90° C. There is recovered about 5 grams of resin which is bright in appearance and is characterized by the following optical rotations and absorption characteristic:

$(\alpha)_D = +35°$ in 94.7% alcohol
$(\alpha)_D = +31°$ in chloroform
$(\alpha)_D = +33°$ in ether $(E_{1cm.}^{1\%})$ 254 m$\mu$ = 252

*Example 2*

A solution containing 10 grams of sodium and 80 cubic centimeters of cyclohexylamine is heated, with stirring, to boiling, whereupon a solution of 5 grams of vitamin $D_2$ in 20 cubic centimeters of cyclohexylamine and 1 drop of water is slowly added. Then a solution of 30 cubic centimeters of cyclohexylamine and 7.9 cubic centimeters of water is added dropwise over a period of about one hour. The temperature at the beginning of the addition is 134° C. and drops slowly to 130° C. Thereafter, 10 cubic centimeters of water are gradually introduced to take up the remaining sodium and the solution is thinned out by the addition of 10 cubic centimeters of cyclohexylamine. After a period of two hours all of the sodium is consumed. The reaction mixture is then cooled and shaken out with diethyl ether and purified substantially as set forth in Example 1. The remaining resin is vacuum dried and there is produced approximately 5 grams of bright, almost colorless resin characterized by the following optical rotations and absorption characteristic:

$(\alpha)_D = +56°$ in 94.7% ethanol
$(\alpha)_D = +50°$ in chloroform $(E_{1cm.}^{1\%})$ 254 m$\mu$ = 278

Example 3

A solution containing 10 grams of sodium and 80 cubic centimeters of xylene is heated, with stirring, to boiling whereupon a solution of 5 grams of vitamin $D_2$ in a mixture of 40 cubic centimeters xylene and 1 cubic centimeter of glacial acetic acid is added. This is augmented by the dropwise addition of a mixture of 100 cubic centimeters of xylene and 25.1 grams of glacial acetic acid so that the reaction does not become too violent. Sodium acetate separates out and slowly thickens the solution to the extent that the reaction solution must be thinned out by the further addition of 150 cubic centimeters of xylene. The temperature during the reaction varied over the range of from 136° C. to 138° C. After four and one-half hours the major portion of the sodium has been consumed and any remaining sodium is taken up with methanol. At this point the solution foams vigorously. The reaction mixture is further diluted with water and cooled. The alkaline, watery solution is separated and shaken out with ether. The ether and xylene portions are combined, washed with water, dilute sulfuric acid, dilute caustic soda and again with water, dried and evaporated in vacuum. The remaining resin is completely dried in the vacuum at a steeping temperature of 80° C. to 90° C. There is recovered about 5 grams of resin which is bright in appearance and is characterized by the following optical rotations and absorption characteristic:

$(\alpha)_D = +49°$ in 94.7% alcohol
$(\alpha)_D = +46°$ in chloroform
$(\alpha)_D = +49°$ in ether $(E_{1\,cm.}^{1\%})$ 254 m$\mu$ = 364

Example 4

To a stirred solution containing 160 cubic centimeters of xylene and 4 cubic centimeters of glacial acetic acid is added a piece of sodium which dissolves vigorously, whereupon, a solution of 5 grams of vitamin $D_2$ in 40 cubic centimeters of xylene is added. Ten grams of sodium are introduced in portions and a mixture of 150 cubic centimeters of xylene and 25 cubic centimeters of glacial acetic acid are added dropwise in order for the reaction solution to always contain an excess of glacial acetic acid. After two and three-quarters hours almost all of the sodium has been consumed whereupon 80 cubic centimeters of methanol is added to take up any residual sodium. The mixture is thinned with water and the xylene separated from the water. The xylene fraction, containing the resin, is washed with dilute caustic soda and water, dried with sodium sulfate, purified of a slight turbidity by treatment with animal charcoal and evaporated in a vacuum. There is recovered about 5 grams of colorless resin which is characterized by the following absorption characteristic:

$(E_{1\,cm.}^{1\%})$ 254 m$\mu$ = 360

Example 5

Two hundred cubic centimeters of cyclohexylamine is combined with 26 cubic centimeters of glacial acetic acid. The solution heats up considerably and a part of the acetic acid salt precipitates out. The solution is then heated with vigorous stirring to a boiling point of 136° C. The salt dissolves completely whereupon a small piece of sodium is added. To this solution is added a solution of 5 grams of vitamin $D_2$ in 40 cubic centimeters of cyclohexylamine. Over a period of 45 minutes additional sodium is added to provide a total of 10 grams of sodium in the reaction mixture. The temperature of the solution varies from 133° C. to 136° C. After one hour, 120 cubic centimeters of additional cyclohexylamine is introduced as a thinning agent. Altogether two and three-quarters hours is required for the complete consumption of the sodium. The slight remaining portion is removed by the careful introduction of methanol and then water. More water is added and a portion of caustic soda to combine with the acetic acid. The amine and methanol are taken off completely with the water vapor under vacuum. The remaining resin, after evaporation of the watery solution, is taken up in ether, washed with dilute sulfuric acid and water, dried with sodium sulfate, purified of discolorations with animal charcoal and vacuum dried. The recovered resin is bright in appearance and is characterized by the following absorption characteristic:

$(E_{1\,cm.}^{1\%})$ 254 m$\mu$ = 308

Example 6

A solution containing 10 grams of sodium and 80 cubic centimeters of xylene is heated, with stirring, to boiling, whereupon a solution of 5 grams of vitamin $D_3$ in 40 cubic centimeters of xylene and 1 cubic centimeter of glacial acetic acid is slowly added. To this mixture, a mixture of 100 cubic centimeters of xylene and 25.1 cubic centimeters of glacial acetic acid is added dropwise. When the solution becomes too thick another 100 cubic centimeters of xylene is added dropwise to thin out the solution. After four and one-half hours the sodium is substantially consumed and any residual sodium is taken up by the addition of caustic soda to make the mixture alkaline. The xylene is driven off by evaporation with the water vapor and the resin is taken off in ether and subsequently washed with dilute caustic soda and with water, dried with sodium sulfate, purified with animal charcoal and vacuum dried. There is produced approximately 5 grams of bright resin containing dihydrotachysterol$_3$ and characterized by the following specific rotations and absorption characteristic:

$(\alpha)_D = +66°$ in 94% alcohol
$(\alpha)_D = +69°$ in chloroform
$(\alpha)_D = +62°$ in ether $(E_{1\,cm.}^{1\%})$ 254 m$\mu$ = 399

Example 7

A solution containing 10 grams of sodium and 200 cubic centimeters of cyclohexylamine is heated, with stirring, to boiling whereupon a solution of 5 grams of vitamin $D_2$ in 40 grams of cyclohexylamine is added followed by the dropwise addition of 27 cubic centimeters of glacial acetic acid over a period of three hours. The temperature of the solution ranges from 132° C. to 134° C. The reaction conditions are maintained for four hours whereupon any remaining sodium is taken up with water. The reaction mixture is further diluted with water and some caustic soda and the amine is taken off with the water vapor. The resin is dissolved in ether, washed with dilute sulfuric acid and dilute caustic soda, dried with sodium sulfate, purified with animal charcoal, filtered and finally dried. There is recovered about 5 grams of resin which is bright in appearance and is characterized by the following optical rotations and absorption characteristic:

$(\alpha)_D = +57°$ in alcohol
$(\alpha)_D = +54°$ in chloroform
$(\alpha_D) = +57°$ in ethyl ether $(E_{1\,cm.}^{1\%})$ 254 m$\mu$ = 354

Example 8

A solution containing 10 grams of sodium and 80 cubic centimeters of xylene is heated, with stirring, to boiling whereupon a solution of 5 grams of vitamin $D_2$ in a mixture of 40 cubic centimeters xylene and 1 cubic centimeter of propionic acid is added dropwise. In the course of a three hour period, a solution of 100 cubic centimeters of xylene and 31.3 grams of propionic acid is added dropwise to thin the solution and when the solution becomes too thick an additional 100 cubic centimeters of xylene is added. The temperature of the reaction is 140° C. to 141° C. After a total of four hours reaction time any remaining sodium is taken up with methanol. Water and caustic soda are added and the methanol and xylene are evaporated off with the water vapor. The resin is dissolved in ether, washed with dilute caustic soda, dried over sodium sulfate, purified with animal charcoal, filtered and vacuum dried. There is recovered about 5 grams of resin which is bright in appearance and is characterized by the following optical rotations and absorption characteristic:

$(\alpha)_D = +53°$ in alcohol
$(\alpha)_D = +48°$ in alcohol
$(\alpha)_D = +52°$ in ether $(E_{1\,cm.}^{1\%})$ 254 m$\mu$ = 340

Example 9

A solution containing 4 grams of sodium and 100 cubic centimeters of diisobutylamine is heated, with stirring, to boiling, whereupon, a solution of 2 grams of vitamin $D_2$ in 20 cubic centimeters diisobutylamine is added, followed by the dropwise addition of 10.5 cubic centimeters of glacial acetic acid. The boiling point of the mixture is 138° C. to 141° C. The reduction is complete in three hours. Methanol and water are used to consume the remaining sodium. After the addition of water and caustic soda, the amine is distilled off with the water vapor. The resin is dissolved in ether, washed with dilute sulfuric acid and water, dried with sodium sulfate, treated with animal charcoal and vacuum dried. There is recovered 2 grams of resin which is bright in appearance and is characterized by the following optical rotations and absorption characteristic:

$(\alpha)_D = +49°$ in alcohol
$(\alpha)_D = +48°$ in chloroform
$(\alpha)_D = +49°$ in ether $(E_{1\,cm.}^{1\%})$ 254 m$\mu$ = 322

Example 10

A solution containing 2 grams of sodium and 50 cubic centimeters of xylene is heated, with stirring, to boiling whereupon a solution of 2 grams of vitamin $D_2$ in a mixture of 10 cubic centimeters xylene and 1 cubic centimeter of ethanolamine is added dropwise followed by the additional dropwise addition of 10 cubic centimeters of ethanolamine. The boiling point of the mixture is 136° C. to 138° C. The reaction is complete in about two and one-quarter hours. The remaining sodium is taken up in methanol and water and the xylene and ethanolamine are distilled off with the water vapor. The resin is dissolved in ether, washed with dilute sulfuric acid and water, dried over sodium sulfate, treated with animal charcoal and vacuum dried. There is recovered 2 grams of resin which is bright in appearance and is characterized by the following optical rotations and absorption characteristic:

$(\alpha)_D = +59°$ in alcohol
$(\alpha)_D = +52°$ in chloroform
$(\alpha)_D = +58°$ in ether $(E_{1\,cm.}^{1\%})$ 254 m$\mu$ = 252

Example 11

A solution containing 10 grams of sodium and 80 cubic centimeters of xylene is heated, with stirring, to boiling whereupon a solution of 5 grams of vitamin $D_2$ in a mixture of 20 cubic centimeters xylene, and 1 cubic centimeter of a mixture of 14 cubic centimeters of glacial acetic acid and 14.5 cubic centimeters of glycol is added dropwise to the boiling solution. Thereafter, the rest of the mixture of acetic acid and glycol is slowly added to the boiling solution. The boiling point of the mixture is 138° C. to 139° C. After about four hours the reduction is complete whereupon any remaining sodium is taken up with methanol and water. Procedures similar to those set forth in the preceding examples are followed and there is recovered 5 grams of resin which is bright in appearance and is characterized by the following optical rotations and absorption characteristic:

$(\alpha)_D = +47°$ in alcohol
$(\alpha)_D = +45°$ in chloroform
$(\alpha)_D = +46°$ in ether $(E_{1\,cm.}^{1\%})$ 254 m$\mu$ = 394

Example 12

A solution containing 5 grams of sodium and 50 cubic centimeters of xylene is heated, with stirring, to boiling. Into this heated solution is added dropwise 1 cubic centimeter of boroglycerin glycerite prepared from the heating of 6.6 grams of boric acid and 20 grams of anhydrous glycerol whereupon a solution of 2.5 grams of vitamin $D_2$ in 10 cubic centimeters of xylene is added dropwise. After about one hour the rest of the batch of boroglycerin glycerite prepared as above is added dropwise. After about two hours the reduction is complete and any remaining sodium is taken up with methanol and water. The resin is purified as set forth in the preceding examples and there is obtained 2.5 grams of bright, almost colorless resin characterized by the following optical rotations and absorption characteristic:

$(\alpha)_D = +54°$ in alcohol
$(\alpha)_D = +50°$ in chloroform
$(\alpha)_D = +54°$ in ether $(E_{1\,cm.}^{1\%})$ 254 m$\mu$ = 300

Example 13

A solution containing 10 grams of sodium and 120 cubic centimeters of xylene is heated, with stirring, to a boil, and a mixture of 0.5 cubic centimeters of glycerol and 0.5 cubic centimeter of cyclohexylamine is added. Thereupon a solution of 5 grams of vitamin $D_2$ in 20 cubic centimeters of xylene is quickly added. To this mixture, a mixture of 39 cubic centimeters of glycerol and 39 cubic centimeters of cyclohexylamine is added dropwise over a period of about three hours. After a period of one hour almost all of the sodium is consumed; the remainder being taken up with methanol and water. The resin is purified as set forth in the preceding examples and there is produced 5 grams of bright, almost colorless resin characterized by the following optical rotations and absorption characteristic:

$(\alpha)_D = +53°$ in alcohol
$(\alpha)_D = +47°$ in chloroform
$(\alpha)_D = +51°$ in ether $(E_{1\,cm.}^{1\%})$ 254 m$\mu$ = 382

Example 14

A solution containing 5 grams of sodium and 80 cubic centimeters of xylene is heated, with stirring, to boiling, whereupon a solution of 2.5 grams of vitamin $D_2$ in 10 cubic centimeters of xylene and 0.5 gram of phenol is slowly added. Then a solution of 20 cubic centimeters of xylene and 20 grams of phenol is added. An additional 50 cubic centimeters of xylene is added to thin out the reaction mixture. After four hours the reduction is substantially complete and residual sodium is taken up in methanol and water. The resin is purified as set forth in the preceding examples and there is produced 2.5 rams of a bright resin characterized by the following optical rotations and absorption characteristic:

$(\alpha)_D = +47.1°$ in 94.7% ethanol
$(\alpha)_D = +44.2°$ in chloroform
$(\alpha)_D = +46.0°$ in ether $(E_{1\,cm.}^{1\%})$ 254 m$\mu$ = 326

Example 15

A solution containing 5 grams of sodium and 100 cubic centimeters of xylene is heated, with stirring, to boiling, whereupon a solution of 5 grams of vitamin $D_2$ in 10 cubic centimeters of xylene and 2 cubic centimeters of ethyl malonate is slowly added. Then 33 grams of ethyl malonate is added dropwise over a three hour period. An hour later nearly all the sodium is consumed and the residue is taken up with methanol and water. The resin is purified as set forth in the preceding examples and there is produced approximately 2.5 grams of resin characterized by the following optical rotations and absorption characteristic:

$(\alpha)_D = +72°$ in alcohol
$(\alpha)_D = +56°$ in chloroform $(E_{1cm.}^{1\%})$ 254 m$\mu$ = 277

*Example 16*

A solution containing 6 grams of sodium and 100 cubic centimeters of toluene is heated, with stirring, to boiling, whereupon a solution of 3 grams of vitamin $D_2$ in 25 cubic centimeters of toluene and 0.5 cubic centimeter of glacial acetic acid is slowly added. Then a mixture of 16 grams of acetic acid and 100 cubic centimeters of xylene is added dropwise over a period of about three hours. The temperature of the mixture is about 112° C. After about four hours the reduction is substantially complete. Any residual sodium is taken up with methanol and water. The resin is purified substantially as set forth in the preceding examples and there is produced approximately 3 grams of a very bright resin characterized by the following optical rotations and absorption characteristic:

$(\alpha)_D = +41°$ in alcohol
$(\alpha)_D = +39°$ in chloroform
$(\alpha)_D = +40°$ in ether $(E_{1cm.}^{1\%})$ 254 m$\mu$ = 324

I claim:

1. The process for producing the reduction product of vitamin $D_3$ which comprises adding a solution of vitamin $D_3$ in xylene and glacial acetic acid to a boiling solution of sodium in xylene and recovering the reduction product thus produced.

2. A process for producing the reduction product of vitamin $D_2$ which comprises reacting said vitamin $D_2$ with sodium and glacial acetic acid.

3. A process for producing the reduction product of vitamin $D_3$ which comprises reacting said vitamin $D_3$ with sodium and glacial acetic acid.

4. The process for producing the reduction product of vitamin $D_2$ which comprises adding a solution of vitamin $D_2$ in xylene and glacial acetic acid to a boiling solution of sodium in xylene and recovering the reduction product thus produced.

5. A process for producing the reduction product of a member selected from the group consisting of vitamin $D_2$ and vitamin $D_3$ which comprises reacting said member with sodium and a compound selected from the group consisting of glacial acetic acid, propionic acid, ethyl malonate, phenol and boroglycerin glycerite.

6. A process for producing the reduction product of a member selected from the group consisting of vitamin $D_2$ and vitamin $D_3$ which comprises reacting said member with sodium and glacial acetic acid.

7. A process for producing the reduction product of a member selected from the group consisting of vitamin $D_2$ and vitamin $D_3$ which comprises reacting said member with sodium and propionic acid.

8. A process for producing the reduction product of a member selected from the group consisting of vitamin $D_2$ and vitamin $D_3$ which comprises reacting said member with sodium and ethyl malonate.

9. A process for producing the reduction product of a member selected from the group consisting of vitamin $D_2$ and vitamin $D_3$ which comprises reacting said member with sodium and phenol.

10. A process for producing the reduction product of a member selected from the group consisting of vitamin $D_2$ and vitamin $D_3$ which comprises reacting said member with sodium and boroglycerin glycerite.

References Cited in the file of this patent

UNITED STATES PATENTS 2,932,654   Westerhoff _____ Apr. 12, 1960